(12) United States Patent
Bauer et al.

(10) Patent No.: US 6,406,527 B1
(45) Date of Patent: Jun. 18, 2002

(54) WATER-SOLUBLE RED ACID DYES, THEIR PREPARATION AND USE

(75) Inventors: Wolfgang Bauer, Maintal; Josef Geisenberger, Sulzbach; Heidemarie Menzel, Bad Soden, all of (DE); Reinhard Pedrazzi, Allschwil (CH)

(73) Assignee: Clariant GmbH, Frankfurt (DE)

( * ) Notice: Subject to any disclaimer, the term of this patent is extended or adjusted under 35 U.S.C. 154(b) by 0 days.

(21) Appl. No.: 09/524,173

(22) Filed: Mar. 13, 2000

(30) Foreign Application Priority Data

Mar. 13, 1999 (DE) .......................... 199 11 195

(51) Int. Cl.[7] .......................... C09D 11/02; C09B 29/09; C09B 29/22; C09B 29/036
(52) U.S. Cl. .................................. 106/31.48; 534/803
(58) Field of Search ....................... 106/31.48; 534/803

(56) References Cited

U.S. PATENT DOCUMENTS

| | | | |
|---|---|---|---|
| 5,188,664 A | 2/1993 | Adamic et al. | 106/31.52 |
| 5,227,477 A | 7/1993 | Auerbach et al. | 534/634 |
| 5,466,282 A | * 11/1995 | Eida et al. | 534/803 |
| 5,772,745 A | * 6/1998 | Gregory et al. | 106/31.48 |
| 5,891,227 A | 4/1999 | Hoffmann et al. | 106/31.52 |
| 6,277,185 B1 | * 8/2001 | Watson et al. | 106/31.48 |

FOREIGN PATENT DOCUMENTS

| | | |
|---|---|---|
| DE | 39 18 653 | 12/1989 |
| EP | 0 626 428 | 11/1994 |
| EP | 0825233 | 2/1998 |

OTHER PUBLICATIONS

EPO Search Report, Jun. 2000.
Patent Abstract for Japan Patent No. 60188468, 9/85.
P. Gregory, High Technology Applications of Organic Colorants, Plenum Press, New York (1991), pp184–201, 1991, No Month Available.
J. Provost, Ink Jet Printing on Textiles, Surface Coatings International 77 (1994), pp. 36–41, 1994, No Month Available.
Topics in Applied Chemistry: High Technology Applications of Organic Colorants, Plenum Press, New York (1991) pp. 15–24, 1991, No Month Available.

* cited by examiner

*Primary Examiner*—Helene Klemanski
(74) *Attorney, Agent, or Firm*—Susan S. Jackson; Scott E. Hanf

(57) ABSTRACT

The present invention provides water-soluble acid dyes of the formula (I)

(I)

in which $R^1$, $R^2$ and $R^3$ independently of one another are A—X—COOM, A—X—$SO_3$M, $OR^4$ or $NR^5R^6$, A is $NR^7$ or S, X is a straight-chain or branched $(C_1–C_{16})$-alkylene radical, a straight-chain or branched, hydroxyl-, carboxyl- or amino-substituted $(C_1–C_{16})$-alkylene radical, an arylene radical or a hydroxyl-, carboxyl- or sulfo-substituted arylene radical;

$R^4$, $R^5$, and $R^6$ independently of one another are hydrogen or $(C_1–C_4)$-alkyl or are $(C_1–C_4)$-alkyl substituted by one or more hydroxyl, 2-hydroxyethoxy, $(C_1–C_4)$-alkoxy or amino groups, $R^7$ is hydrogen, methyl or ethyl;

M is a monovalent cation or one equivalent of a polyvalent cation, and which are suitable for printing natural and synthetic fiber materials for recording liquids, especially for the inkjet process, and for pulp-dyeing paper.

11 Claims, No Drawings

WATER-SOLUBLE RED ACID DYES, THEIR PREPARATION AND USE

BACKGROUND OF THE INVENTION

The present invention relates to water-soluble acid dyes, to processes for preparing them, to their use for dyeing and printing natural and synthetic fiber materials, and to recording liquids, especially for the inkjet process, and liquid formulations for the pulp dyeing of paper, which comprise the dyes of the invention.

The inkjet process constitutes a contactless printing process in which droplets of the recording liquid are guided from one or more nozzles onto the substrate that is to be printed. In order to obtain prints of high definition and resolution, the recording liquids and the dyes present in them must meet very stringent requirements in terms, in particular, of purity, freedom from particles, sclubility storage stability, viscosity, surface tension, and conductivity.

Very stringent requirements are imposed in particular on color strength, shade, brightness and fastness properties such as, for example, fastness to light, fastness to water and fastness to rubbing. High lightfastness in particular is of great importance for inkjet applications in exterior regions and for the production of inkjet prints of photographic quality. In some cases, these properties are obtained by using mixtures of various dyes having different properties. This is described, for example, in EP 0 825 233 A2 and U.S. Pat. No. 5,188,664.

The development of water-soluble magenta dyes having the desired combination of shade, high brightness and color strength, high lightfastness and good waterfastness, has to date proven very difficult (see, for example, P. Gregory, High-Technology Applications of Organic Colorants, Plenum Press, New York (1991), pp. 197–201.

Water-soluble reactive dyes which can be used to dye or print cotton fibers are known. Furthermore, these dyes can also be used to produce inks for inkjet printing (Surface Coatings International 77 (1994) 36–41). However, the known reactive dyes have disadvantages in connection with the production of recording liquids for the inkjet process, especially in terms of the storage stability of inks and recording liquids and the lightfastness of the resulting prints.

SUMMARY OF THE INVENTION

There is therefore a need for water-soluble dyes which are superior to the known magenta dyes in terms in particular of shade, storage stability of the inks, and waterfastness and which at the same time meet the other properties required in the inkjet sector.

It has surprisingly been found that the requirements imposed are met by water-soluble acid dyes defined hereinbelow.

DESCRIPTION OF THE PREFERRED EMBODIMENTS

The present invention provides acid dyes of the formula (I)

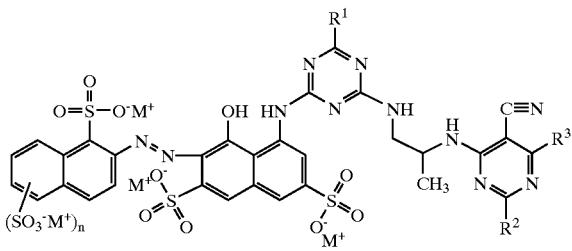

in which $R^1$, $R^2$ and $R^3$ independently of one another are A-X-COOM, A-X-$SO_3$M, $OR^4$ or $NR^5R^6$, A is $NR^7$ or S, X is a straight-chain or branched ($C_1$–$C_{16}$)-alkylene radical, a straight-chain or branched, hydroxyl-, carboxyl- or amino-substituted ($C_1$–$C_{16}$)-alkylene radical, an arylene radical or a hydroxyl-, carboxyl- or sulfo-substituted arylene radical;

$R^4$, $R^5$ and $R^6$ independently of one another are hydrogen or ($C_1$–$C_4$)-alkyl or are ($C_1$–$C_4$)-alkyl substituted by one or more - e.g., 2, 3 or 4-hydroxyl, 2-hydroxyethoxy, ($C_1$–$C_4$)-alkoxy or amino groups, $R^7$ is hydrogen, methyl or ethyl;

M is a monovalent cation or one equivalent of a polyvalent cation, and n is 0 or 1.

Preference is given to compounds of the formula (I) in which X is a straight-chain or branched ($C_1$–$C_6$)-alkylene radical, a straight-chain or branched, hydroxyl-, carboxyl- or amino-substituted ($C_1$–$C_6$)-alkylene radical, a phenylene radical or a hydroxyl-, carboxyl- or sulfo-substituted phenylene radical. With particular preference X is a ($C_1$–$C_4$)-alkylene or phenylene radical. X is, for example, methylene, ethylene, ethane-1,1-diyl, propane-1,1-diyl, 1,2-propylene, 1,3-propylene, 1,6-hexylene, 2-methylpropane-1,1-diyl, 3-methylbutane-1,1-diyl, 2-methylbutane-1,1-diyl, 2-hydroxyethane-1,1-diyl, 2-carboxyethane-1,1-diyl, 3-carboxypropane-1,1-diyl, 5-aminopentane-1,1-diyl, 3-aminopropane-1,1-diyl or 4-aminobutane-1,1-diyl.

$R^4$, $R^5$ and $R^6$ are for example hydrogen, methyl, ethyl, hydroxymethyl, hydroxyethyl, 2-hydroxypropyl, 3-hydroxypropyl, methoxyethyl or ethoxyethyl, preference being given to hydrogen, hydroxyethyl end hydroxypropyl.

$R^7$ is preferably hydrogen.

M is preferably hydrogen or a lithium, sodium, potassium or ammonium ion of formula (II)

$$R^8R^9R^{10}R^{11}N^+ \quad (II)$$

in which $R^8$, $R^9$, $R^{10}$ and $R^{11}$ independently of one another are hydrogen, unsubstituted ($C_1$–$C_4$)-alkyl or ($C_1$–$C_4$)-alkyl substituted by one or more—e.g., 2, 3 or 4-hydroxyl or 2-hydroxyethoxy groups.

M, furthermore, is preferably a mixture of said cations.

In preferred water-soluble acid dyes of the formula (I), the radicals $R^1$, $R^2$ and $R^3$ independently of one another are A—X—COOM and A—X—$SO_3$M.

In particularly preferred dyes of the formula (I) of the invention, the radicals $R^1$, $R^2$ and $R^3$ are A—X—$SO_3$M.

The acid dyes of the formula (I) of the invention can be prepared, for example, by reacting the reactive dye of the formula (III)

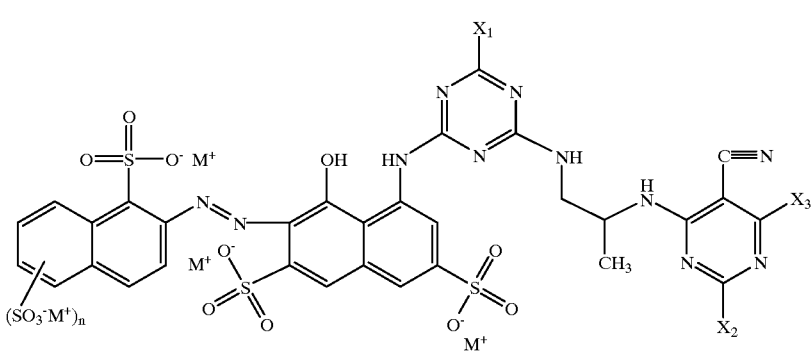

(III)

in which M and n are as already defined and $X_1$, $X_2$ and $X_3$ are a halogen atom, preferably a chlorine or bromine atom, with one or more—e.g., 1, 2 or 3compounds of the formulae (IV), (V), (VI) and/or (VII)

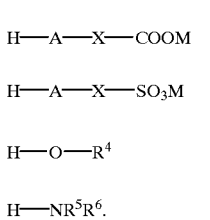

The reactions are normally conducted in an aqueous medium at a pH of from 3 to 14, preferably from 7.5 to 12, and at temperatures from 10° C. to 100° C., preferably from 40 to 80° C. The compounds of the formula (IV)–(VII) are judiciously used in from 1 to 2.5 times the molar amount per radical $X_1$ to $X_3$.

The compounds of the formula (III) can be prepared in a manner known per se, as described, for example, in DE-A-39 18 653.

Examples of carboxylic acids of the formula (IV) that can be used are the following: glycine, N-methylglycine, 2-aminopropionic acid, 3-aminopropionic acid, 2-aminobutyric acid, 3-aminobutyric acid, 6-aminohexanecarboxylic acid, valine, leucine, isoleucine, serine, aspartic acid, glutamic acid, lysine, 1,3-diaminobutyric acid, 1,4-diaminopentanecarboxylic acid, 2-aminobenzenecarboxylic acid, 3-aminobenzenecarboxylic acid, 4-aminobenzenecarboxylic acid, 5-aminobenzene-1,3-dicarboxylic acid, thioglycolic acid and 3-mercaptopropanecarboxylic acid.

Examples of suitable sulfonic acids of the formula (V) are the following: aminomethanesulfonic acid, taurine, 2-aminopropanesulfonic acid, 3-amino-propanesulfonic acid, 2-aminobenzenesulfonic acid, 3-aminobenzenesulfonic acid, 4-aminobenzenesulfonic acid, 3-mercaptopropanesulfonic acid and 4-aminobenzene-1,3-disulfonic acid.

Examples of hydroxy compounds of the formula (VI) that can be used include water, methanol, ethanol, isopropanol, n-butanol, isobutanol, glycol, propylene glycol, glycol monomethyl ether, glycol monoethyl ether and glycol monobutyl ether.

Examples of suitable amines of the formula (VII) include ammonia, methylamine, ethylamine, propylamine, hexylamine, ethanolamine, diethanolamine, 2-aminopropanol, 3-aminopropanol, dipropylamine, N-methylethanol, 3-dimethylaminopropylamine and 3-diethylaminopropylamine.

The acid dyes of the formula (I) of the invention can be isolated from the preferably aqueous reaction mixtures obtained initially by means of customary methods of working up: for example, by salting out, filtration or spray drying, directly or following partial or complete demineralization by means of membrane filtration. Alternatively, isolation can be dispensed with and the reaction mixture comprising dyes of the formula (I) of the invention can be converted directly into concentrated dye solutions by adding organic and/or inorganic bases and/or humectants and, if desired, after partial or complete demineralization by means of membrane filtration.

Examples of suitable inorganic bases are lithium hydroxide, lithium carbonate, sodium hydroxide, sodium hydrogen carbonate, potassium hydroxide, potassium carbonate and ammonia. Examples of suitable organic bases are monoethanolamine, diethanolamine, triethanolamine, 2-aminopropanol, 3-aminopropanol, dipropanolamine, tripropanolamine, N-methylaminoethanol, N,N-dimethylaminoethanol, N-phenylaminopropanol, ethylenediamine, tetramethylethylenediamine, tetramethylpropylenediamine, tetramethylhexylenediamine, diethylenetriamine, triethylenetetramine and polyethylenimine.

Examples of humectants are formamide, urea, tetramethylurea, ε-caprolactam, ethylene glycol, diethylene glycol, triethylene glycol, polyethylene glycol, butylglycol, methyl Cellosolve, glycerol, N-methylpyrrolidone, 1,3-diethyl-2-imidazolidinone, sodium xylenesulfonate, sodium cumenesulfonate and sodium butyl monoglycol sulfate.

The present invention also provides the use of water-soluble acid dyes of the formula (I) for dyeing and printing natural and synthetic fiber materials, especially for recording text and images on various recording media, and also for pulp-dyeing paper or pulps.

The acid dyes of the formula (I) of the invention are suitable, for example, as colorants in electrophotographic toners and developers, such as one- and two-component powder toners, magnetic toners, liquid toners, polymerization toners, and also specialty toners.

Typical toner binders are addition-polymerization, polyaddition and polycondensation resins, such as styrene, styrene acrylate, styrene-butadiene, acrylate, polyester and phenol-epoxy resins, polysulfones, polyurethanes, individually or in combination, and also polyethylene and polypropylene, which can contain further constituents such as charge control agents, waxes or flow agents or may have these constituents added subsequently.

The acid dyes of the invention are further suitable as colorants in powders and powder coating materials, especially in triboelectrically or electrokinetically sprayed powder coating materials which are used to coat the surfaces of articles made, for example, from metal, wood, plastic, glass, ceramic, concrete, textile material, paper or rubber.

Powder coating resins used are typically epoxy resins, carboxyl- and hydroxyl-containing polyester resins, polyurethane resins and acrylic resins, together with customary hardeners. Resin combinations are also used. For example, epoxy resins are frequently used in combination with carboxyl- and hydroxyl-containing polyester resins. Typical hardener components (depending on the resin system) are, for example, acid anhydrides, imidazoles and also dicyandiamide and derivatives thereof, blocked isocyanates, bisacylurethanes, phenolic resins and melamine resins, triglycidyl isocyanurates, oxazolines and dicarboxylic acids.

The acid dyes of the invention are suitable, moreover, as colorants for color filters, and also for both additive and subtractive color generation (cf. P. Gregory "Topics in Applied Chemistry: High Technology Applications of Organic Colorants" Plenum Press, New York 1991, pages 15–25).

The dyes of the invention are particularly suitable for preparing recording liquids, especially aqueous and non-aqueous inks for the inkjet printing process, and also for those inks which operate in accordance with the hot-melt process and/or are based on microemulsions, and also for other printing, copying, marking, writing, drawing, stamping or registering processes. Red printed images of excellent quality are obtained which are notable for very good brightness and print definition and also for good lightfastness, abrasion resistance and waterfastness.

The present invention additionally provides recording liquids which comprise one or more of the water-soluble acid dyes of the formula (I), alone or together with other water-soluble dyes for shading. The precise composition of the recording liquid must be adapted to the intended end use.

The ready-to-use recording liquids generally contain in total 0.5 to 15% by weight (calculated on a dry basis) of one or more—e.g., 2, 3 or 4-dyes of the formula (I), from 0 to 99% by weight of water and from 0.5 to 99.5% by weight of solvents and/or humectants. In one preferred embodiment the ready-to-use recording liquids contain from 0.5 to 15% by weight of dye, from 35 to 75% by weight of water and from 10 to 50% by weight of solvents and/or humectants; in another preferred embodiment they contain from 0.5 to 15% by weight of dyes, from 0 to 20% by weight of water and from 70 to 99.5% by weight of solvents and/or humectants. The ready-to-use recording liquids may also include further additives, which are mentioned below. Water used to prepare the recording liquids is preferably in the form of distilled or deionized water. The humectants and/or solvents present in the recording liquids can comprise an organic solvent or a mixture of such solvents, with preference being given to water-miscible solvents. Examples of suitable solvents are mono- or polyhydric alcohols, their ethers and esters, such as alkanols, especially those of 1 to 4 carbon atoms, examples being methanol, ethanol, propanol, isopropanol, butanol and isobutanol; dihydric or trihydric alcohols, especially those of 2 to 6 carbon atoms, examples being ethylene glycol, propylene glycol, 1,3-propanediol, 1,4-butanediol, 1,5-pentanediol, 1,6-hexanediol, 1,2,6-hexanetriol, glycerol, diethylene glycol, dipropylene glycol, triethylene glycol, polyethylene glycol, tripropylene glycol and polypropylene glycol; lower alkyl ethers of polyhydric alcohols, such as ethylene glycol monomethyl, monoethyl or monobutyl ether and triethylene glycol monomethyl or monoethyl ether; ketones and ketone alcohols such as acetone, methyl ethyl ketone, diethyl ketone, methyl isobutyl ketone, methylpentyl ketone, cyclopentanone, cyclohexanone and diacetone alcohol; amides, such as dimethylformamide, dimethylacetamide and N-methylpyrrolidone, for example; and also urea, tetramethylurea, and thiodiglycol.

In addition, the recording liquids of the invention may include customary additives, examples being preservatives, cationic, anionic or nonionic surface-active substances (surfactants and wetting agents), and also viscosity regulators, for example, polyvinyl alcohol, cellulose derivatives, or water-soluble natural or synthetic resins as film formers and/or binders for enhancing the adhesive strength and abrasion resistance.

Amines, such as ethanolamine, diethanolamine, triethanolamine, N,N-dimethyl-ethanolamine and diisopropylamine, for example, serve primarily to increase the pH of the recording liquid. They are normally present in proportions of from 0 to 10% by weight, preferably from 0.5 to 5% by weight, in the recording liquid.

Depending on the embodiment of the printing process as, for example, a continuous jet, intermittent jet, impulse jet or compound jet process, further additives may be added to the recording liquids for the inkjet printing process in order, for example, to buffer the pH or to adjust the electrical conductivity, specific heat, heat expansion coefficient, and conductivity.

The storage of recording liquids of the invention is not accompanied by the deposition of precipitates leading to poorly defined printed images or nozzle blockage.

EXAMPLES

In terms of viscosity and surface tension, the recording liquids of the invention are within the ranges suitable for inkjet processes. They give printed images of high optical density with excellent lightfastness, waterfastness, abrasion resistance and resolution.

In the examples below, the indications relating to purity are percentages by weight.

Example 1

15.9 g of the dye of the formula

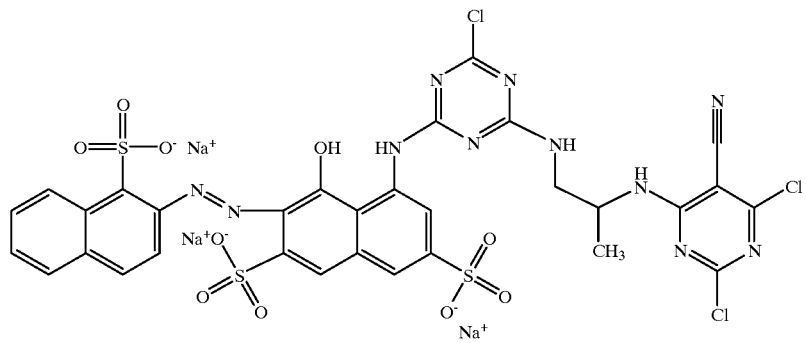

are introduced into 150 ml of water, and a solution of 3.8 g of taurine in 10 ml of water is added at 20° C. The reaction mixture is subsequently heated to 60° C. and the pH is held at 9.0 by adding 4.4 ml of a 10-molar NaOH solution. The reaction is completed by stirring at 95° C. for 2 hours, after which the resulting solution containing the red dye of the formula

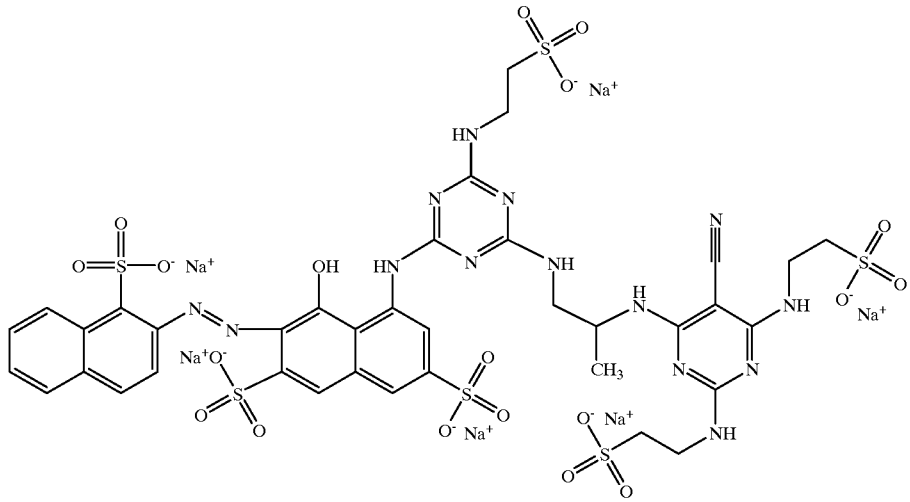

is cooled to room temperature. This dye solution is subsequently demineralized by membrane filtration and dried.

Yield: 11.8 g of red powder; Absorption spectrum in water: 8max=550 nm.

The resulting acid dye is outstandingly suitable for preparing recording liquids for the inkjet process, where it gives bright bluish red printed images of very good waterfastness and lightfastness.

Example 2

The procedure of Example 1 is repeated but using 1.83 g of ethanolamine instead of a solution of 3.8 g of taurine in 10 ml of water; demineralization of the dye solution obtained initially, followed by spray drying, gives 10.4 g of a red dye of the formula which is outstandingly suitable for preparing recording liquids for the inkjet process.

Absorption maximum in water: 8max: 552 nm.

Example 3

1000 g of the dye solution obtained in accordance with Example 1 are demineralized and then admixed with 2.0 g of a commercially customary preservative, e.g., ®Mergal K 10 N. This gives 602 g of a 10% strength dye solution which is stable on storage and is outstandingly suitable for preparing inks for the inkjet process.

Example 4

Preparation of Inks Containing 2.5% Pure Dye 2.5 g of pure dye from Example 1 are introduced and dissolved with stirring at 25° C. in a mixture of 20.0 g of diethylene glycol, 2.5 g of N-methylpyrrolidone, 1.0 g of triethanolamine and 76.4 g of water.

The table below lists further dyes of the invention, of the formula

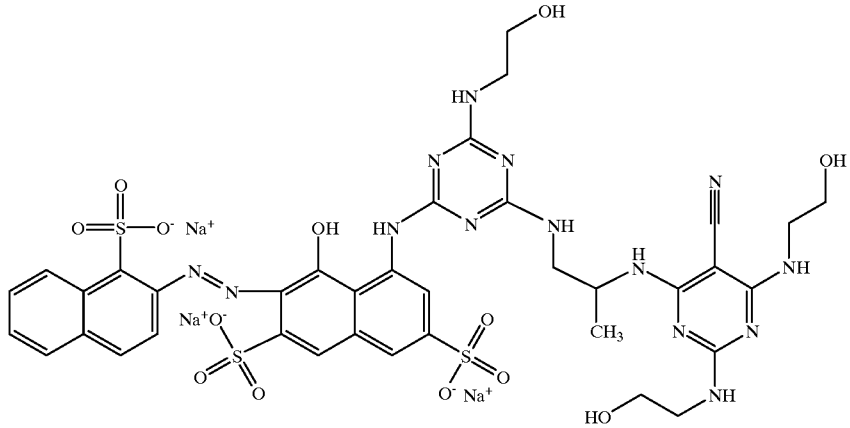

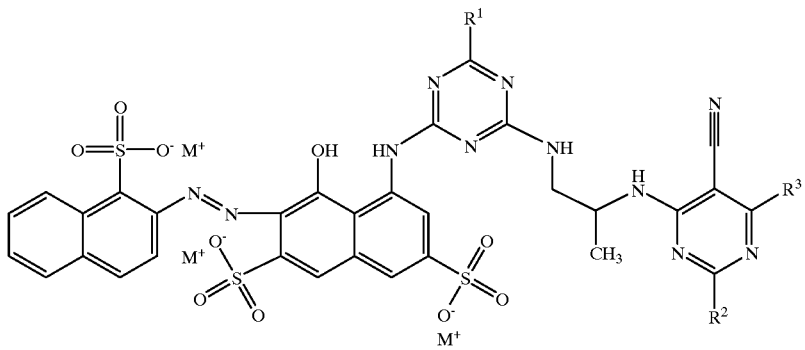

the table showing the radicals $R^1$, $R^2$ and $R^3$, which are derived from the compounds of the formulae (IV) to (VII), and also showing the cation M and the absorption spectrum in water.

| Ex. | $R^1$ | $R^2$ | $R^3$ | $M^+$ | $\delta_{max}$ (nm) |
|---|---|---|---|---|---|
| 6 | $SCH_2COO^-$ | $SCH_2COO^-$ | $SCH_2COO^-$ | Na | 553 |
| 7 | $NHCH_2COO^-$ | $NHCH_2COO^-$ | $NHCH_2COO^-$ | Na | 550 |
| 8 | $SCH_2CH_2CH_2SO_3^-$ | $SCH_2CH_2CH_2SO_3^-$ | $SCH_2CH_2CH_2SO_3^-$ | Na | 551 |
| 9 | $NHCH_2CH_2SO_3^-$ | $NHCH_2CH_2SO_3^-$ | $NHCH_2CH_2SO_3^-$ | Na | 550 |
| 10 | $NHCH_2CH_2OH$ | $NHCH_2CH_2OH$ | $NHCH_2CH_2OH$ | Na | 552 |
| 11 | $NHCH_2CH_2CH_2N(CH_3)_2$ | $NHCH_2CH_2CH_2N(CH_3)_2$ | $NHCH_2CH_2CH_2N(CH_3)_2$ | Na | 553 |
| 12 | OH | OH | OH | Na | 547 |

What is claimed is:

1. An acid dye of the formula (I)

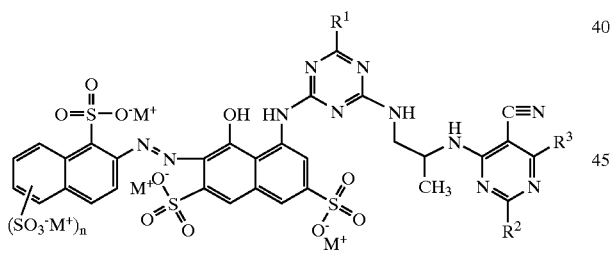

in which
$R^1$, $R^2$ and $R^3$ independently of one another are A-X-COOM, A-X-$SO_3$M, $OR^4$ or $NR^5R^6$,
A is $NR^7$ or S,
X is a straight-chain or branched ($C_1$–$C_{16}$)-alkylene radical, a straight-chain or branched, hydroxyl-, carboxyl- or amino-substituted ($C_1$–$C_{16}$)-alkylene radical, an arylene radical or a hydroxyl-, carboxyl- or sulfo-substituted arylene radical;
$R^4$, $R^5$, and $R^6$ independently of one another are hydrogen or ($C_1$–$C_4$)-alkyl or are ($C_1$–$C_4$)-alkyl substituted by one or more hydroxyl, 2-hydroxyethoxy, ($C_1$–$C_4$)-alkoxy or amino groups,
$R^7$ is hydrogen, methyl or ethyl;
M is a monovalent cation or one equivalent of a polyvalent cation, and
n is 0 or 1.

2. An acid dye as claimed in claim 1, wherein X is an alkylene group of 1 to 6 carbon atoms which can be substituted by hydroxyl, carboxyl or amino.

3. An acid dye as claimed in claim 1, wherein X is phenylene which can be substituted by hydroxyl, carboxyl or sulfo.

4. An acid dye as claimed in claim 1, wherein $R^4$, $R^5$ and $R^6$ are hydrogen, methyl, ethyl, hydroxymethyl, hydroxyethyl, hydroxypropyl, methoxyethyl or ethoxyethyl.

5. An acid dye as claimed in claim 1, wherein M is a hydrogen, lithium, sodium or potassium ion or an ammonium ion of the formula (II)

$$R^8R^9R^{10}R^{11}N^+ \quad (II)$$

in which $R^8$, $R^9$, $R^{10}$ and $R^{11}$ independently of one another are hydrogen, unsubstituted ($C_1$–$C_4$)-alkyl, or a ($C_1$–$C_4$)-alkyl substituted by one or more hydroxyl or 2-hydroxyethoxy groups, or is a mixture of said cations.

6. A process for preparing an acid dye of the formula (I) as claimed in claim 1, which comprises reacting a compound of the formula (III)

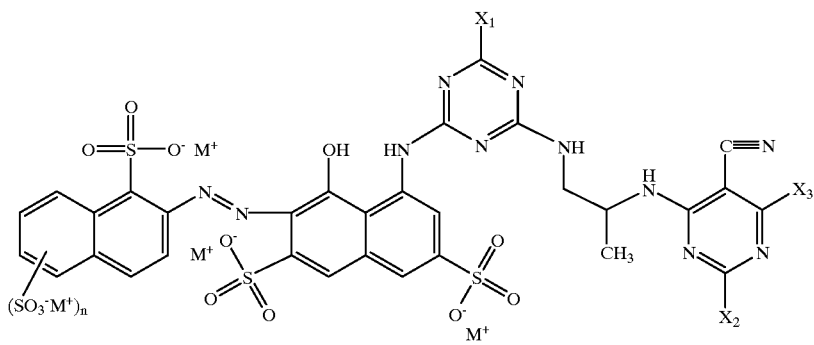
(III)

in which $X_1$, $X_2$, and $X_3$ are a halogen atom with one or more compounds of the formulae (IV), (V), (VI), (VII)

H—A—X—COOM (IV)

H—A—X—SO$_3$M (V)

H—O—R$^5$ (VI)

H—NR$^6$R$^7$. (VII)

7. A method of coloring materials selected from the group consisting of natural or synthetic fiber materials, text and image recording materials, paper, paper pulp, electrophotographic toners and powder coating materials, comprising the step of adding an acid dye as claimed in claim 1 to said materials.

8. A recording liquid comprising one or more acid dyes of the formula (I) as claimed in claim 1.

9. A recording liquid as claimed in claim 8, containing from 0.5 to 15% by weight of one or more acid dyes of the formula (I), from 0 to 99% by weight of water and from 0.5 to 99.5% by weight of solvents, humectants or a combination thereof.

10. A recording liquid as claimed in claim 8, containing from 0.5 to 15% by weight of one or more acid dyes of the formula (I), from 35 to 75% by weight of water and from 10 to 50% by weight of solvents, humectants or a combination thereof.

11. A recording liquid as claimed in claim 8, containing from 0.5 to 15% by weight of one or more acid dyes of the formula (I), from 0 to 20% by weight of water and from 70 to 99.5% by weight of solvents, humectants or a combination thereof.

* * * * *